(12) United States Patent
Xiong et al.

(10) Patent No.: US 9,231,788 B2
(45) Date of Patent: Jan. 5, 2016

(54) METHOD AND DEVICE FOR ESTIMATING CHANNEL IN MULTIPLE-RECEIVING ANTENNA SYSTEM

(71) Applicant: ZTE CORPORATION, Shenzhen, Guangdong Province (CN)

(72) Inventors: Gaocai Xiong, Shenzhen (CN); Hongfeng Qin, Shenzhen (CN); Yue Xiao, Shenzhen (CN); Hongzhi Zhao, Shenzhen (CN)

(73) Assignee: ZTE CORPORATION, Shenzhen, Guangdong Province ( * ) Notice: Subject to any disclaimer, the term of this patent is extended or adjusted under 35 U.S.C. 154(b) by 0 days.

(21) Appl. No.: 14/421,783

(22) PCT Filed: Aug. 16, 2013

(86) PCT No.: PCT/CN2013/081683
§ 371 (c)(1),
(2) Date: Feb. 13, 2015

(87) PCT Pub. No.: WO2014/026650
PCT Pub. Date: Feb. 20, 2014

(65) Prior Publication Data
US 2015/0236872 A1    Aug. 20, 2015

(30) Foreign Application Priority Data

Aug. 17, 2012 (CN) .......................... 2012 1 0294420

(51) Int. Cl.
*H04L 27/06* (2006.01)
*H04L 25/02* (2006.01)
(Continued)

(52) U.S. Cl.
CPC ............ *H04L 25/025* (2013.01); *H04B 7/0413* (2013.01); *H04L 5/005* (2013.01); *H04L 25/0242* (2013.01); *H04L 27/265* (2013.01)

(58) Field of Classification Search
CPC . H04L 25/024; H04L 25/025; H04L 25/0242; H04L 5/005; H04L 27/265; H04B 7/0413
USPC ................. 375/260, 262, 267, 316, 340, 343, 375/346–350
See application file for complete search history.

(56) References Cited

U.S. PATENT DOCUMENTS 7,532,689 B2 * 5/2009 Ji ............................ H04L 1/005
375/260
7,702,042 B2 * 4/2010 Desperben .......... H04L 25/0212
375/340

(Continued)

FOREIGN PATENT DOCUMENTS

CN       1303546 A     7/2001
CN       1348639 A     5/2002

(Continued)

OTHER PUBLICATIONS

International Search Report (Form PCT/ISA/210) for PCT/CN2013/081683 mailed Nov. 21, 2013.

*Primary Examiner* — Khanh C Tran
(74) *Attorney, Agent, or Firm* — Koppel, Patrick, Heybl & Philpott

(57) ABSTRACT

Disclosed are a method and device for estimating a channel in a multiple-receiving antenna system. The method comprises: a channel estimation is performed on a received pilot signal by using a least square channel estimation algorithm to obtain an estimation value $H_{LS}$; an N'-dimensional channel autocorrelation matrix formula (I) and a channel frequency domain autocorrelation matrix $R_i$ from a transmitting antenna i to any receiving antenna are acquired, and a weight matrix W which is descrambled and denoised is calculated, wherein i= 1, 2, . . . , $N_T$, and $N_T$ is the number of antennae at a transmitting end; the estimation value $H_{LS}$ is corrected by using the weight matrix W to obtain a corrected estimation value $H_{P-LMMSE}$. The method and device of the disclosure may obtain the performance as close as possible to the LMMSE technology through less prior statistic information, and have a simple implementation manner.

14 Claims, 2 Drawing Sheets

(51) Int. Cl.
*H04L 5/00* (2006.01)
*H04L 27/26* (2006.01)
*H04B 7/04* (2006.01)

(56) References Cited

U.S. PATENT DOCUMENTS

| | | | |
|---|---|---|---|
| 8,737,546 B2* | 5/2014 | Zhengang | H04L 25/022 375/260 |
| 8,761,274 B2* | 6/2014 | Lopez de Victoria | H04B 7/0848 375/260 |
| 8,923,447 B2* | 12/2014 | Hu | H04L 25/0212 375/316 |
| 2004/0114506 A1* | 6/2004 | Chang | H04L 1/0618 370/208 |
| 2004/0240587 A1* | 12/2004 | Ozen | H04L 25/023 375/340 |
| 2005/0094747 A1* | 5/2005 | Park | H04L 25/0212 375/340 |
| 2014/0098912 A1* | 4/2014 | Yin | H04B 7/0417 375/345 |

FOREIGN PATENT DOCUMENTS

| | | | | |
|---|---|---|---|---|
| CN | 1890909 A | 1/2007 | | |
| CN | 101227254 A | 7/2008 | | |
| IT | EP 1530333 A1 * | 5/2005 | | H04L 1/0618 |

\* cited by examiner

METHOD AND DEVICE FOR ESTIMATING CHANNEL IN MULTIPLE-RECEIVING ANTENNA SYSTEM

TECHNICAL FIELD

The disclosure relates to the field of multiple-receiving antenna communication system, and in particular to a channel estimation technology in a multi-carrier multi-antenna system.

BACKGROUND

A doppler effect and a multi-path phenomenon of a wireless channel cause amplitude phase time varying distortion and inter-code interference of a received signal. A multi-carrier communication system (OFDM and SC-FDM) uses a cyclic prefix to obtain a valid anti inter-code interference capability; and a multi-antenna (MIMO) system uses the independence of the decline between antennae to increase link stability or improve system capacity. The combination of the two greatly develops features of the wireless channel, and turns a defect thereof into a favourable factor which can improve capacity; therefore, a multi-carrier MIMO system is widely adopted in a new generation of mobile communications (such as LTE and WiMax).

For recovering a transmitting signal successfully, channel estimation is a step which is necessary in a multi-carrier MIMO system receiver. The channel estimation of the multi-carrier system is mainly divided into two categories, blind channel estimation and pilot assisted channel estimation, wherein the pilot assisted channel estimation may obtain higher estimation accuracy and stability, and is thus widely adopted in a practical system. Different from the pilot assisted channel estimation in a traditional multi-carrier system, the multi-carrier MIMO system relates to acquisition of channel gains of paths among multiple antennae; therefore, it is necessary to design a special pilot arrangement solution to avoid interference among multi-antennae; and the disclosure adopts the following frequency domain code division pilot frequency design:

When the number of transmitting antennae is $N_T$, assuming that the number of sub-carriers occupied by a user is K, a time domain pilot sequence $x_i(n)$, $i=1, 2, \ldots, N_T$, $n=1, 2, \ldots, K$ is firstly generated, wherein $x_i(n)$ is $(i-1)K/N_T$ cyclic shift version of $x_1(n)$, i.e., $x_i(n)=x_1(n-(i-1)K/N_T \mod K)$; and $N_T$ time domain sequence are respectively transformed into frequency domain sequence, and are recorded as a diagonal form to obtain $x_i$, $i=1, 2 \ldots, N_T$, and $X_i=X_1\Lambda_i$, wherein $\Lambda_i$ is a diagonal matrix, the lth diagonal element is:

$$\Lambda_i[l, l] = \exp\left(j2\pi \frac{(i-1)}{N_T}(l-1)\right).$$

In addition, the pilot time domain and frequency domain sequences are both constant modulus sequences, such as ZC. After zero-padding, a frequency domain pilot signal is extended to N, and is sent, after an IFFT and an adding CP operation, to a RF antenna to perform operations such as D/A and up-conversion, so as to be transmitted.

Any antenna at a receiving end obtains a digital receiving signal via down-conversion and A/D sampling; and after a CP being removed, an N-point FFT, and an demultiplexing operation, the frequency domain received pilot signal may be obtained and is:

$$Y = \sum_{i=1}^{N_T} X_i H_i + N = \sum_{i=1}^{N_T} X_1 \Lambda_i H_i + N,$$

where $H_i$ is a channel gain from a transmitting antenna i to a receiving antenna, having a frequency domain autocorrelation matrix $R_{H_i}$, and N is white Gaussian noise, having a frequency domain autocorrelation matrix $N_0 I$, wherein $N_0$ is white noise power, and I is an identity matrix.

Firstly, three pilot frequency-based channel estimation technologies in a common OFDM (also applicable to SC-FDM) currently will be introduced:

Least square (LS) channel estimation: LS channel estimation is the basest and simplest channel estimation method in the OFDM system. In the method, the direct inverse multiplication of a receiving signal at a pilot frequency sub-carrier location and a pilot frequency signal is taken as an estimation value of a channel; and LS channel estimation is also a basic step of other more complex channel estimation technologies. LS channel estimation has the lowest calculation complexity; however, the method does not consider deterioration of the estimation performance caused by the noise and interference between antennae at all; and once the method is adopted, it may significantly influence system performance.

Discrete Fourier transform-based (DFT-Based) channel estimation: DFT-Based channel estimation performs noise filtering and interference suppression by using the feature that vector energy of a time domain channel is concentrated. Frequency domain LS channel estimation is firstly performed; then a channel frequency domain response value is transformed into a time domain response value via IDFT, to perform windowing on an impulse response of the channel so as to suppress noise; and finally, the channel frequency domain response value is transformed into a frequency domain response value, so as to obtain a final channel frequency domain response estimation value. Since the DFT operation has a rapid computer execution method and the DFT-Based technology has lower complexity, the windowing operation may suppress noise and interference between antennae effectively. However, leakage phenomenon of time domain channel energy causes the technology to inevitably suffer the influence of losing useful information and remaining interference between antennae.

Linear minimum mean squared error (LMMSE) channel estimation: an LMMSE algorithm uses channel statistic information to obtain linear estimation of a minimum mean squared error, and is a linear optimal estimation algorithm. The LMMSE algorithm has a higher calculation complexity, and needs the channel statistic information to perform estimation; and this is hard to be obtained in practice.

The embodiments of the disclosure provide a practical LMMSE channel estimation technology, i.e., PLMMSE (Practical LMMSE), which is a channel estimation algorithm that can be achieved in practice, and can obtain accurate channel estimation in a case where multi-antenna of a transmitter adopts frequency domain code division multiplexing.

SUMMARY

An embodiment of the disclosure provides a practical LMMSE channel estimation algorithm, which can provide more effective channel estimation to perform MIMO detection, and needs less prior statistic information.

As described above, after a CP is removed, an N-point FFT, and a demultiplexing operation, a received pilot signal may be expressed as:

$$Y = \sum_{i=1}^{N_T} X_i H_i + N = \sum_{i=1}^{N_T} X_1 \Lambda_i H_i + N,$$

where $H_i$ is a channel gain from a transmitting antenna i to a receiving antenna, having a frequency domain autocorrelation matrix $R_{H_i}$, and N is white Gaussian noise, having a frequency domain autocorrelation matrix $N_0$. $\Lambda_i$ is a diagonal matrix, the lth diagonal element is:

$$\Lambda_i[l, l] = \exp\left(j2\pi \frac{(i-1)}{N_T}(l-1)\right).$$

LS channel estimation is firstly performed:

$$H_{LS} = X_1^{-1} Y = \sum_{i=1}^{N_T} \Lambda_i H_i + \overline{N},$$

where $$\overline{N} = X_1^{-1} N.$$

The PLMMSE technology is executed by taking the above-mentioned LS estimation as a basis, comprising the following steps:

Step 1, N-dimensional channel autocorrelation matrix $\overline{R}$ is acquired:

$$\overline{R} = F_N \mathrm{diag}\left(\frac{N}{M} \left[\underbrace{1, \ldots, 1}_{M}, 0, \ldots, 0\right]\right) F_N^H,$$

where M is CP length, $F^N$ is an N-point FFT transformation matrix, and the nth row and kth column of elements thereof may be recorded as:

$$F_N(n, k) = \frac{1}{\sqrt{N}} \exp\left(-2\pi j \frac{(n-1)(k-1)}{N}\right).$$

Step 2, a channel frequency domain autocorrelation matrix $\Lambda_i \overline{R}_H \Lambda_i^H$ from an antenna i to any receiving antenna is acquired, wherein $\overline{R}_H = (\overline{R})_{1:K,1:K}$, and $(\overline{R})_{1:K,1:K}$ represents a sub-matrix formed from the first K rows and the first K columns of elements of the matrix $\overline{R}$.

Step 3, according to statistic information obtained via the above-mentioned steps and white noise power $N_0$ known to a receiving end, a weight matrix:

$$W = \overline{R}_H \left(\sum_{i=1}^{N_T} \Lambda_i \overline{R}_H \Lambda_i^H + N_0 I\right)^{-1}$$

is calculated.

Step 4, a final channel estimation value is acquired according to the weight matrix W and an LS estimation value $H_{LS}$ obtained in advance:

$$H_{P\text{-}LMMSE} = \overline{R}_H \left(\sum_{i=1}^{N_T} \Lambda_i \overline{R}_H \Lambda_i^H + N_0 I\right)^{-1} H_{LS},$$

and the channel estimation value obtained thereby may be used for subsequent MIMO detection.

Advantage

The embodiments of the disclosure are applicable to multi-antenna channel estimation under a scenario of adopting frequency domain code division multiplexing pilot arrangement, which obtain the performance as close as possible to the LMMSE technology in a case where channel statistic information is unknown, and have simple implementation steps. The performance of the PLMMSE channel estimation provided by the embodiments of the disclosure is improved by about 1.5 db with respect to a DFT-Based channel estimation algorithm.

DETAILED DESCRIPTION OF THE EMBODIMENTS

The embodiments of the disclosure are described below in detail by taking 2 transmitting antenna scenario as an example.

Figure 1:
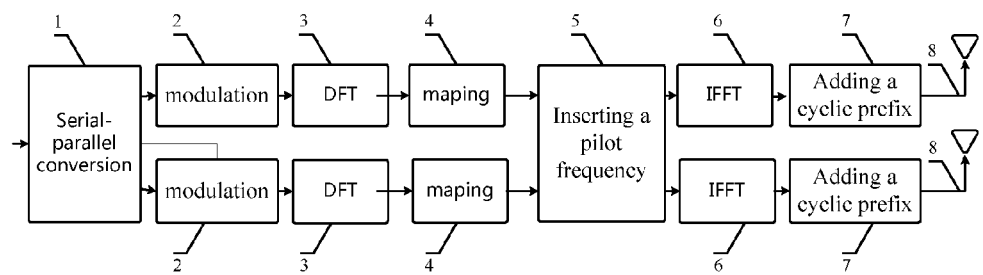
FIG. 1 is a schematic structural diagram of a typical transmitter according to an embodiment of the disclosure.

FIG. 1 is a schematic structural diagram of a typical transmitter according to an embodiment of the disclosure; considering a two-transmitting-two-receiving V-BLAST system baseband model based on SC-FDMA, after being performed a serial-parallel conversion by component 1, user data is divided into two paths to be modulated by component 2, then is transformed into data in frequency domain via component 3DFT (a 600-point FFT transformation may be adopt); and a pilot frequency is jointly inserted to the data in the frequency domain by component 5. A frequency domain symbol and a pilot symbol achieves frequency division multiplexing with other users via sub-carrier mapping, then are performed with IFFT (1024-point IFFT variation) transformation via component 6 into data in time domain, and finally, are converted and transmitted by component 8 after being added with a CP (a normal CP or an abnormal CP) in component 7.

Figure 2:
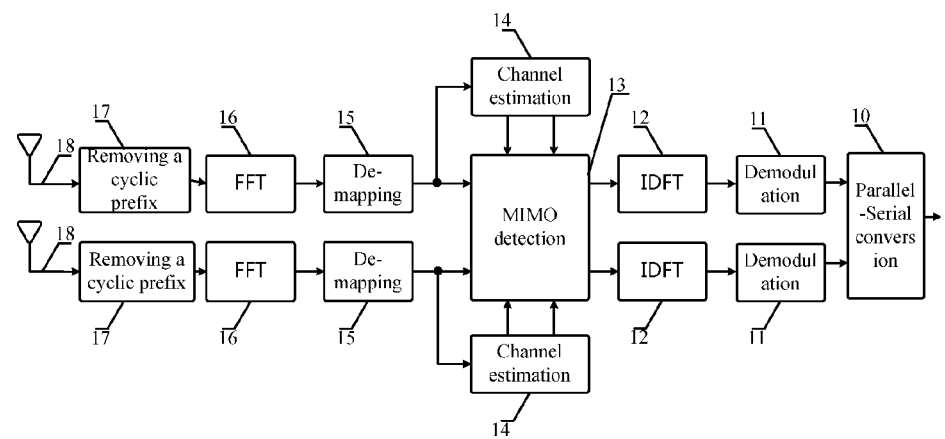
FIG. 2 is a schematic structural diagram of a typical receiver according to an embodiment of the disclosure.

FIG. 2 is a schematic structural diagram of a typical receiver according to an embodiment of the disclosure; at a receiving end, a down-conversion operation is performed on the received data firstly (realized by component 18, wherein 18 represents an inverse process corresponding to component 8, other serial number being the same); two receiving antennae respectively use component 17 to remove a CP, perform FFT transformation into data in frequency domain via component 16, and obtain a transmitting signal which is through the influence of a fading channel and noise via a de-mapping operation of component 15 in frequency domain; at this time, it is still two separate paths of transmitting signal; and after that, a receiver performs channel estimation on a data symbol by using component 14 and then performs an MIMO operation by using component 13, respectively performs IDFT transformation on separate signals, obtains transmitting data of each antenna via a demodulation operation of component 11, and finally obtains the transmitting data after a parallel-serial conversion by component 10.

Figure 3:
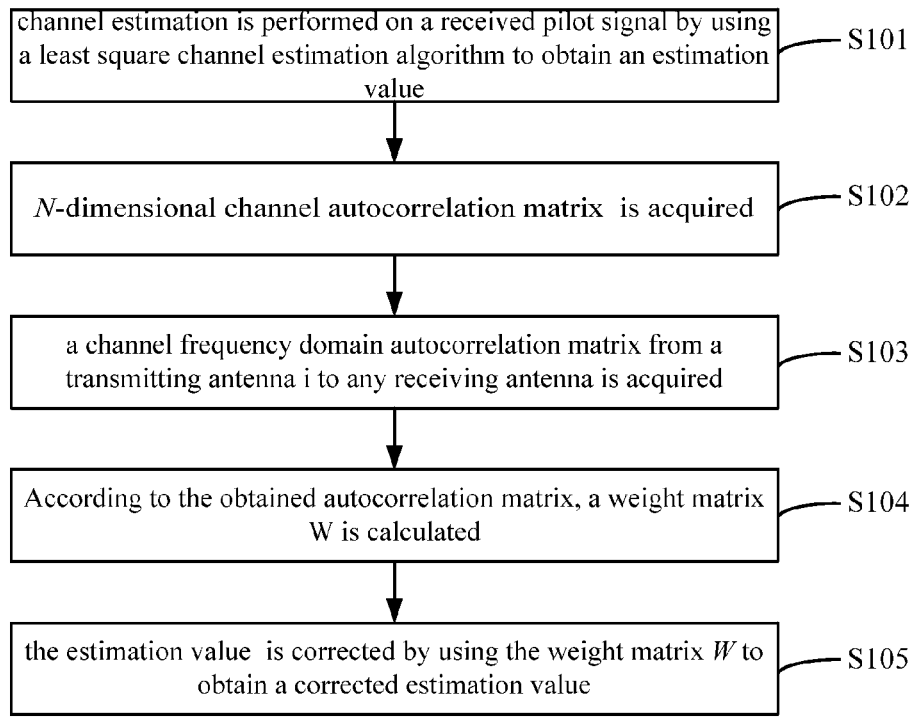
FIG. 3 is a flow chart of a channel estimation operation.

FIG. 3 is a flow chart of a channel estimation operation according to an embodiment of the disclosure. Specific operations are as shown below:

After down-conversion, A/D, being removing a CP, and N-point FFT, the received pilot symbol may obtain a frequency domain vector Y via demultiplexing; LS estimation is performed to obtain $H^{LS}$; and the estimation is achieved by components 21 and 22. The solution provide by the embodiment of the disclosure is implemented based on LS estimation, and the specific steps are as follows:

Step 1, N-dimensional channel autocorrelation matrix $\overline{R}$ is acquired:

$$\overline{R} = F_N \mathrm{diag}\left(\frac{N}{M}\left[\underbrace{1, \ldots, 1}_{M}, 0, \ldots, 0\right]\right) F_N^H,$$

where M is CP length. The matrix represents channel statistic information, obtained by component 23.

Step 2, channel frequency domain autocorrelation matrixes $\overline{R}_H$ and $\Lambda \overline{R}_H \Lambda^H$ from antenna 1 and antenna 2 to any receiving antenna are acquired, where $\overline{R}_H = (\overline{R})_{1:K,1:K}$, and $(\overline{R})_{1:K,1:K}$ represents a sub-matrix formed from the first K rows and the first K columns of elements of the matrix $\overline{R}$.

Step 3, according to statistic information obtained via the above-mentioned steps and white noise power $N_0$ known to a receiving end, a weight matrix W is calculated: $W = \overline{R}_H (\overline{R}_H + \Lambda \overline{R}_H \Lambda^H + N_0 I)^{-1}$, the matrix being represented by component 24.

Step 4, according to the weight matrix W and an LS estimation value $H^{LS}$ obtained in advance, a final channel estimation value (represented by component 25) is acquired:

$$H_{P\text{-}LMMSE} = \overline{R}_H (\overline{R}_H + \Lambda \overline{R}_H \Lambda^H + N_0 I)^{-1} H_{LS}.$$

Figure 4:
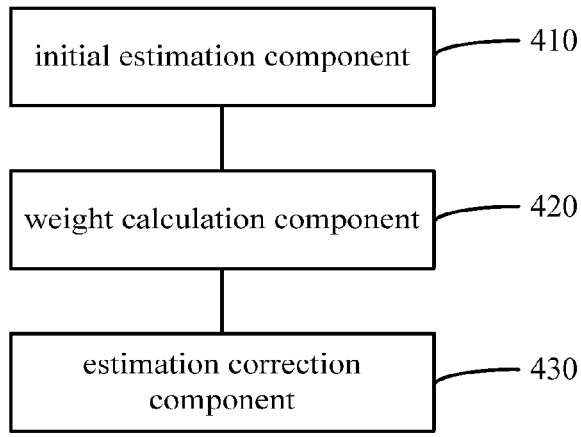
FIG. 4 is a schematic structural diagram of a device for estimating a channel in a multiple-receiving antenna system according to an embodiment of the disclosure.

FIG. 4 is a schematic structural diagram of a device for estimating a channel in a multiple-receiving antenna system according to an embodiment of the disclosure; as shown in FIG. 4, an initial estimation component 410 is configured to perform channel estimation on a received pilot signal by using a least square channel estimation algorithm to obtain an estimation value $H^{LS}$, a weight calculation component 420 acquires an N'-dimensional channel autocorrelation matrix $\overline{R}$, and a channel frequency domain autocorrelation matrix $R_i$ from a transmitting antenna i to any receiving antenna to calculate a weight matrix W after being descrambled and denoised, wherein i=1, 2, . . . , $N_T$, $N_T$ is the number of antennae at a transmitting end; and an estimation correction component 430 is configured to correct the estimation value $H_{LS}$ by using the weight matrix W to obtain a corrected estimation value $H_{P\text{-}LMMSE}$.

Preferably, the weight matrix W, which is after being descrambled and denoised and obtained by calculating by the weight calculation component 420, $$= \overline{R}_H \left(\sum_{i=1}^{N_T} R_i + N_0 I\right)^{-1},$$

wherein $\overline{R}_H$ is a sub-matrix formed from the first K rows and the first K columns of elements of the autocorrelation matrix $\overline{R}$, K being the number of sub-carriers occupied by a user, $N_0$ is white noise power, and I is an identity matrix.

Preferably, the weight calculation component 420 is configured to acquire the channel frequency domain autocorrelation matrix $R_i$, which is from a transmitting antenna i to any receiving antenna and obtained according to the following formula $R_i = \Lambda_i \overline{R}_H \Lambda_i^H$, where $\Lambda_i$ is a diagonal matrix, and $\Lambda_i^H$ is a conjugate transpose matrix of the diagonal matrix $\Lambda_i$, and the lth diagonal element of the matrix $\Lambda_i$ is $$\Lambda_i[l, l] = \exp\left(j2\pi \frac{(i-1)}{N_T}(l-1)\right).$$

Preferably, the weight calculation component 420 is configured to acquire the N'-dimensional channel autocorrelation matrix $\overline{R}$, which is obtained according to the following formula $$\overline{R} = F_{N'} \mathrm{diag}\left(\frac{N'}{M}[1, \ldots, 1, 0, \ldots, 0]\right) F_{N'}^H,$$

where M is cyclic prefix length, $F_{N'}$ is an N' point FFT transformation matrix, and $F_{N'}^H$ is a conjugate transpose matrix of $F_{N'}$.

Preferably, the corrected channel estimation value corrected by the estimation correction component 430 is $H_{P\text{-}LMMSE} = W H_{LS}$.

Herein, the disclosure has been described in detail through a specific embodiment; the above-mentioned embodiment is provided for those skilled in the art to create or apply to the disclosure; and various modifications to these embodiments would be readily understood by those skilled in the art. The disclosure is not limited to merely process LTE uplink channel estimation, but can also process scenarios such as a downlink channel, or more transmitting antennae. The disclosure is not limited to these examples or some aspects therein.

The above-mentioned description has shown and described one embodiment of the disclosure; however, as described previously, it should be understood that the disclosure is not limited to the form disclosed herein, shall not be taken as an exclusion from other embodiments, but can be used in various other combinations, modifications environments, and shall be modified through the above-mentioned teachings or techniques or knowledge in the related art within the scope of the inventive concept herein. Moreover, all modifications and changes made by those skilled in the art without departing from the spirit and scope of the invention shall fall within the protection scope of claims attached in the disclosure.

What is claimed is:
1. A method for estimating a channel in a multiple-receiving antenna system, comprising:
performing channel estimation on a received pilot signal by using a least square channel estimation algorithm to obtain an estimation value $H_{LS}$;

acquiring an N'-dimensional channel autocorrelation matrix $\overline{R}$, and a channel frequency domain autocorrelation matrix $R_i$ from a transmitting antenna i to any receiving antenna to calculate a weight matrix W which is descrambled and denoised, wherein i=1, 2, ..., $N_T$, and $N_T$ is the number of antennas at a transmitting end; and correcting the estimation value $H_{LS}$ by using the weight matrix W to obtain a corrected estimation value $H_{P-LMMSE}$.

2. The method according to claim 1, wherein the weight matrix W, which is descrambled and denoised, is calculated according to a formula $$W = \overline{R}_H \left( \sum_{i=1}^{N_T} R_t + N_0 I \right)^{-1},$$

where $\overline{R}_H$ is a sub-matrix formed from the first K rows and the first K columns of elements of the autocorrelation matrix $\overline{R}$, K is the number of sub-carriers occupied by a user, $N_0$ is white noise power, and I is an identity matrix.

3. The method according to claim 2, wherein the obtained channel frequency domain autocorrelation matrix $R_i$ from the transmitting antenna i to any receiving antenna is calculated according to a formula $R_i = \Lambda_i \overline{R}_H \Lambda_i^H$, where $\Lambda_i$ is a diagonal matrix, $\Lambda_i^H$ is a conjugate transpose matrix of the diagonal matrix $\Lambda_i$, and the lth diagonal element of the matrix $\Lambda_i$ is $$\Lambda_i[l, l] = \exp\left( j2\pi \frac{(i-1)}{N_T}(l-1) \right).$$

4. The method according to claim 1, wherein the obtained N'-dimensional channel autocorrelation matrix $$\overline{R} = F_{N'} \text{diag}\left( \frac{N'}{M}[1, \ldots, 1, 0, \ldots, 0] \right) F_{N'}^H,$$

where M is cyclic prefix length, $F_{N'}$ is an N'-point FFT transformation matrix, and $F_{N'}^H$ is a conjugate transpose matrix of $F_{N'}$.

5. The method according to claim 1, wherein the corrected channel estimation value $H_{P-LMMSE} = WH_{LS}$.

6. A device for estimating a channel in a multiple-receiving antenna system, comprising:
an initial estimation component configured to perform channel estimation on a received pilot signal by using a least square channel estimation algorithm to obtain an estimation value $H_{LS}$;
a weight calculation component configured to acquire an N'-dimensional channel autocorrelation matrix $\overline{R}$, and a channel frequency domain autocorrelation matrix $R_i$ from a transmitting antenna i to any receiving antenna, and to calculate a weight matrix W which is descrambled and denoised, wherein i=1, 2, ..., $N_T$, and $N_T$ is the number of antennas at a transmitting end; and
an estimation correction component configured to correct the estimation value $H_{LS}$ by using the weight matrix W to obtain a corrected estimation value $H_{P-LMMSE}$.

7. The device according to claim 6, wherein the weight matrix W, which is descrambled and denoised, is calculated by the weight calculation component according to a formula $$W = \overline{R}_H \left( \sum_{i=1}^{N_T} R_t + N_0 I \right)^{-1},$$

where $\overline{R}_H$ is a sub-matrix formed from the first K rows and the first K columns of elements of the autocorrelation matrix $\overline{R}$, K is the number of sub-carriers occupied by a user, $N_0$ is white noise power, and I is an identity matrix.

8. The device according to claim 7, wherein the channel frequency domain autocorrelation matrix $R_i$ from the transmitting antenna i to any receiving antenna is calculated by the weight calculation component according to a formula $R_i = \Lambda_i \overline{R}_H \Lambda_i^H$, where $\Lambda_i$ is a diagonal matrix, $\Lambda_i^H$ is a conjugate transpose matrix of the diagonal matrix $\Lambda_i$, and the lth diagonal element of the matrix $\Lambda_i$ is $$\Lambda_i[l, l] = \exp\left( j2\pi \frac{(i-1)}{N_T}(l-1) \right).$$

9. The device according to claim 6, wherein the weight calculation component is configured to acquire the N'-dimensional channel autocorrelation matrix $$\overline{R} = F_{N'} \text{diag}\left( \frac{N'}{M}[1, \ldots, 1, 0, \ldots, 0] \right) F_{N'}^H,$$

wherein M is cyclic prefix length, $F_{N'}$ is an N'-point FFT transformation matrix, and $F_{N'}^H$ is a conjugate transpose matrix of $F_{N'}$.

10. The device according to claim 6, wherein the corrected channel estimation value corrected by the estimation correction component is $H_{P-LMMSE} = WH_{LS}$.

11. The method according to claim 2, wherein the obtained N'-dimensional channel autocorrelation matrix $$\overline{R} = F_{N'} \text{diag}\left( \frac{N'}{M}[1, \ldots, 1, 0, \ldots, 0] \right) F_{N'}^H,$$

where M is cyclic prefix length, $F_{N'}$ is an N'-point FFT transformation matrix, and $F_{N'}^H$ is a conjugate transpose matrix of $F_{N'}$.

12. The method according to claim 1, wherein the obtained N'-dimensional channel autocorrelation matrix $$\overline{R} = F_{N'} \text{diag}\left( \frac{N'}{M}[1, \ldots, 1, 0, \ldots, 0] \right) F_{N'}^H,$$

where M is cyclic prefix length, $F_{N'}$ is an N'-point FFT transformation matrix, and $F_{N'}^H$ is a conjugate transpose matrix of $F_{N'}$.

13. The device according to claim 7, wherein the weight calculation component is configured to acquire the N'-dimensional channel autocorrelation matrix $$\overline{R} = F_{N'} \text{diag}\left( \frac{N'}{M}[1, \ldots, 1, 0, \ldots, 0] \right) F_{N'}^H,$$

wherein M is cyclic prefix length, $F_{N'}$ is an N'-point FFT transformation matrix, and $F_{N'}^H$ is a conjugate transpose matrix of $F_{N'}$.

14. The device according to claim 8, wherein the weight calculation component is configured to acquire the N'-dimensional channel autocorrelation matrix $$\bar{R} = F_{N'} \text{diag}\left(\frac{N'}{M}[1, \ldots, 1, 0, \ldots, 0]\right) F_{N'}^H,$$

wherein M is cyclic prefix length, $F_{N'}$ is an N'-point FFT transformation matrix, and $F_{N'}^H$ is a conjugate transpose matrix of $F_{N'}$.

* * * * *